US012639518B1

(12) United States Patent
Elbaz et al.

(10) Patent No.: US 12,639,518 B1
(45) Date of Patent: May 26, 2026

(54) END-TO-END AI ASSET DISCOVERY AND INVENTORY

(71) Applicant: Onyx Security Ltd, Tel Aviv (IL)

(72) Inventors: Gil Elbaz, Tel Aviv (IL); Maxim Kogan, Tel Aviv (IL); Yuval Ostrovsky, Tel Aviv (IL)

(73) Assignee: Onyx Security Ltd, Tel Aviv (IL)

( * ) Notice: Subject to any disclaimer, the term of this patent is extended or adjusted under 35 U.S.C. 154(b) by 0 days.

(21) Appl. No.: 19/388,537

(22) Filed: Nov. 13, 2025

(51) Int. Cl.
| | |
|---|---|
| *G06F 40/279* | (2020.01) |
| *G06F 40/35* | (2020.01) |
| *G06N 20/00* | (2019.01) |

(52) U.S. Cl.
CPC ............ *G06F 40/279* (2020.01); *G06F 40/35* (2020.01)

(58) Field of Classification Search
CPC ........ G06F 16/285; G06F 16/35; G06F 16/38; G06F 16/383; G06F 40/279; G06F 40/30; G06F 40/35; G06N 20/00
USPC ..................................... 704/1, 9; 706/12, 20
See application file for complete search history.

(56) References Cited

U.S. PATENT DOCUMENTS

| | | | |
|---|---|---|---|
| 8,176,019 | B2 | 5/2012 | Brodie et al. |
| 8,230,387 | B2 | 7/2012 | Srivastava et al. |
| 9,311,615 | B2 | 4/2016 | Davenport et al. |
| 10,860,721 | B1 | 12/2020 | Gentile |
| 11,102,052 | B2 | 8/2021 | Sharma |
| 11,212,316 | B2 | 12/2021 | Sweeney et al. |
| 11,283,840 | B2 | 3/2022 | Murray et al. |
| 11,503,061 | B1 | 11/2022 | Lin et al. |
| 11,748,458 | B2 | 9/2023 | Sarkar |
| 11,863,578 | B1 | 1/2024 | Speck et al. |
| 12,088,599 | B1 | 9/2024 | McCarson |
| 12,326,900 | B1 * | 6/2025 | Martín .................... G06F 16/41 |
| 12,363,156 | B1 | 7/2025 | Thompson et al. |
| 12,388,806 | B2 | 8/2025 | Davis et al. |
| 12,418,556 | B2 | 9/2025 | Hamdi |
| 12,481,665 | B1 | 11/2025 | Gargano et al. |
| 12,499,329 | B2 | 12/2025 | Shah et al. |
| 2002/0059093 | A1 | 5/2002 | Barton et al. |
| 2003/0229525 | A1 | 12/2003 | Callahan et al. |
| 2004/0093408 | A1 | 5/2004 | Hirani et al. |
| 2004/0260566 | A1 | 12/2004 | King |
| 2006/0100958 | A1 | 5/2006 | Cheng et al. |
| 2007/0288253 | A1 | 12/2007 | Cobb et al. |
| 2008/0015913 | A1 | 1/2008 | Courtney et al. |
| 2008/0033775 | A1 | 2/2008 | Dawson et al. |
| 2008/0082609 | A1 * | 4/2008 | O'Sullivan .......... G06Q 10/107 709/224 |

(Continued)

OTHER PUBLICATIONS

Artificial Intelligence Risk & Governance Wharton, University of Pennsylvania, Jan. 11, 2023 (Year: 2023) (26 pages).

(Continued)

*Primary Examiner* — Martin Lerner
(74) *Attorney, Agent, or Firm* — M&B IP Analysts LLC

(57) ABSTRACT

The present disclosure relates to end-to-end discovery of artificial intelligence (AI) assets in a networked environment. AI assets distributed across the environment are identified, including assets whose identities are not initially known. For such assets, collected operational and contextual data are analyzed to determine their identities. The disclosed approach provides improved visibility into AI assets and supports effective management and governance of AI systems.

19 Claims, 5 Drawing Sheets

(56) References Cited

U.S. PATENT DOCUMENTS

| | | | |
|---|---|---|---|
| 2008/0221944 | A1 | 9/2008 | Kelly et al. |
| 2009/0319312 | A1 | 12/2009 | Moerdler et al. |
| 2010/0324952 | A1 | 12/2010 | Bastos et al. |
| 2011/0055119 | A1 | 3/2011 | Sengupta |
| 2014/0129457 | A1 | 5/2014 | Peeler |
| 2014/0137257 | A1 | 5/2014 | Martinez et al. |
| 2016/0012235 | A1 | 1/2016 | Lee et al. |
| 2016/0366080 | A1* | 12/2016 | Bastide ................. H04L 51/212 |
| 2017/0126712 | A1 | 5/2017 | Crabtree et al. |
| 2017/0330197 | A1 | 11/2017 | Dimaggio et al. |
| 2017/0357502 | A1 | 12/2017 | Barday |
| 2018/0191730 | A1 | 7/2018 | Deters et al. |
| 2018/0268318 | A1* | 9/2018 | Matam .................... G06F 40/35 |
| 2018/0285887 | A1 | 10/2018 | Maung |
| 2019/0207981 | A1 | 7/2019 | Sweeney et al. |
| 2019/0355060 | A1* | 11/2019 | Collins .................. G06N 20/00 |
| 2021/0211472 | A1 | 7/2021 | Murray et al. |
| 2021/0216928 | A1 | 7/2021 | O'Toole et al. |
| 2021/0326411 | A1 | 10/2021 | Sarkar |
| 2021/0334386 | A1 | 10/2021 | AlGhamdi et al. |
| 2021/0335367 | A1* | 10/2021 | Graff ...................... G06F 40/20 |
| 2021/0374767 | A1 | 12/2021 | Kurian et al. |
| 2022/0050828 | A1* | 2/2022 | Wu ........................ G06F 40/284 |
| 2022/0188717 | A1 | 6/2022 | Daley et al. |
| 2022/0366332 | A1 | 11/2022 | Duessel |
| 2022/0407883 | A1 | 12/2022 | Rao et al. |
| 2023/0061234 | A1 | 3/2023 | Calado et al. |
| 2023/0113332 | A1 | 4/2023 | Crabtree et al. |
| 2023/0208882 | A1 | 6/2023 | Crabtree et al. |
| 2023/0269272 | A1 | 8/2023 | Dambrot et al. |
| 2023/0283521 | A1 | 9/2023 | Berger et al. |
| 2023/0308474 | A1 | 9/2023 | Thompson |
| 2023/0315764 | A1* | 10/2023 | Kumar .................... G06F 40/30 |
| | | | 704/9 |
| 2023/0328095 | A1 | 10/2023 | Chesla et al. |
| 2024/0163304 | A1 | 5/2024 | Gupta |
| 2024/0223587 | A1 | 7/2024 | Berger et al. |
| 2024/0314158 | A1 | 9/2024 | Bourzikas |
| 2024/0348664 | A1 | 10/2024 | Mohanram et al. |
| 2024/0411867 | A1 | 12/2024 | Sakazi et al. |
| 2024/0420161 | A1 | 12/2024 | Shah et al. |
| 2024/0422187 | A1 | 12/2024 | Shah et al. |
| 2025/0005488 | A1 | 1/2025 | Meline, Jr. |
| 2025/0047701 | A1 | 2/2025 | Siddam et al. |
| 2025/0063083 | A1 | 2/2025 | Grinberg et al. |
| 2025/0156303 | A1 | 5/2025 | Stevens |
| 2025/0200290 | A1* | 6/2025 | Birru ........................ G06F 40/40 |
| 2025/0247414 | A1 | 7/2025 | Baragaba et al. |
| 2025/0317464 | A1 | 10/2025 | Mehrotra et al. |
| 2025/0335598 | A1 | 10/2025 | Charles et al. |
| 2025/0358296 | A1 | 11/2025 | Ray et al. |
| 2025/0377864 | A1 | 12/2025 | Dangi et al. |
| 2025/0378178 | A1 | 12/2025 | Pettingill |
| 2025/0384374 | A1 | 12/2025 | Ohashi et al. |
| 2025/0390352 | A1 | 12/2025 | Crabtree et al. |
| 2026/0017386 | A1 | 1/2026 | Ohayon et al. |
| 2026/0039674 | A1 | 2/2026 | Siekman et al. |
| 2026/0081939 | A1 | 3/2026 | Boyer |

OTHER PUBLICATIONS

Artificial Intelligence Risk Management Framework: Generative Artificial Intelligence Profile National Institute of Standards and Technology, NIST, Jul. 2024 (Year: 2024) (64 pages).
Establishing a Governance Framework for AI-Powered Applications PaloAlto Networks, Cortex Cloud, White Paper, (Year: 2025) (14 pages).
Kundu, Rohit, Comprehensive Guide To Large Language Model (LLM) Security Lakera, May 21, 2025 (Year: 2025) (36 pages).
LLM Security for Enterprises: Risks and Best Practices Wiz Experts Team, Wiz, Oct. 12, 2025 (Year: 2025) (19 pages).
Milovanovic, Miroslav, Primer: AI Security Posture Management (AI-SPM) Knostic, 2025 (Year: 2025) (9 pages).
Porter, Alexis, AI SPM: AI Security Posture Management Big.ID Next, Sep. 23, 2025 (Year: 2025) (9 Pages).
Saura, Pablo Fernandez et al., On Automating Security Policies with Contemporary LLMs (short paper) arXiv, Jun. 5, 2025 (Year: 2025) (7 Pages).
Simplify Custom Posture Rule Creation with Upwind's LLM-based Rego Support Upwind.io, 2025 (Year: 2025) (11 Pages).
Streamline AI Governance with Informatic Informatica, eBook, 2025 (Year: 2025) (17 Pages).
What is AI-SPM (AI Security Posture Management)? SentinelOne, Sep. 3, 2025 (Year: 2025) (18 Pages).
Keller, Brandon, AI Security Posture Management (AI-SPM): What it is and How it Works Forcepoint, Apr. 18, 2025 (Year: 2025).
Alkady et al., "Pentora: an Integrated Framework for Automated Web and Network Vulnerability Assessment," 2025 International Mobile, Intelligent, and Ubiquitous Computing Conference (MIUCC) Year: 2025 | Conference Paper | Publisher: IEEE.
Chandel et al., "Endpoint Protection: Measuring the Effectiveness of Remediation Technologies and Methodologies for Insider Threat," 2019 International Conference on Cyber-Enable Distributed Computing and Knowledge Discovery (CyberC) Year: 2019 | Conference Paper | Publisher: IEEE.

* cited by examiner

END-TO-END AI ASSET DISCOVERY AND INVENTORY

TECHNICAL FIELD

This disclosure relates, generally, to the field of computing, particularly, to cybersecurity and artificial intelligence (AI), and more particularly, to end-to-end AI asset discovery.

BACKGROUND

Artificial intelligence (AI) technologies have rapidly proliferated within enterprise environments, becoming integral to various operations, ranging from analytics and automation to customer engagement and strategic decision-making. Modern enterprise environments routinely deploy numerous AI assets, such as large language models, computer vision systems, recommendation engines, predictive analytics frameworks, and generative AI tools, across both on-premises and cloud environments. These assets may be embedded in internal software, integrated via third-party APIs, or consumed through external service providers.

While these AI assets enable substantial business value, as the use of AI expands, enterprises face growing difficulty in maintaining visibility and control over all AI-related assets within their networks. AI assets are often created or integrated independently by different teams or business units, resulting in a fragmented and opaque landscape. This lack of centralized awareness prevents effective governance and significantly increases an organization's exposure to risk.

Additionally, undiscovered or unmanaged AI assets pose numerous threats. They may process sensitive or regulated data without proper safeguards, expose interfaces vulnerable to exploitation, depend on unverified training data, or integrate with external AI services that lack enterprise-grade security. Moreover, shadow AI deployments, those not officially sanctioned or inventoried, operate without security review, compliance validation, or monitoring. Such assets can become entry points for data leakage, model poisoning, adversarial manipulation, or unauthorized model replication.

Currently, enterprise asset management and security solutions primarily focus on traditional IT assets, such as networks, endpoints, servers, and databases. Furthermore, modern AI governance tools concentrate on narrow aspects of AI risk, such as bias, fairness, or explainability, instead of on comprehensive asset discovery and classification. As a result, enterprises lack a unified mechanism to automatically identify, catalog, and assess all AI assets distributed across their digital infrastructure. Thus, there exists a need for an implementation of end-to-end AI asset discovery that is capable of automatically discovering AI assets across an enterprise network, regardless of their deployment origin, location, or operational status, by detecting both sanctioned and unsanctioned AI components, classify their function, and provide a foundational inventory upon which governance, compliance, and security controls can effectively be applied.

Therefore, it would be advantageous to provide an efficient solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key nor critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by a data processing apparatus, cause the apparatus to perform the actions.

In one general aspect, the method may include discovering one or more AI assets across a networked environment. The method may also include determining if one or more of the discovered one or more AI assets have unknown identities; and upon determining that one or more of the discovered one or more AI assets have unknown identities, analyzing collected data corresponding to the discovered one or more AI assets with unknown identities, to determine each of their identities. Other embodiments of this aspect include corresponding computer systems, apparatus, and computer programs recorded on one or more computer storage devices, each configured to perform the actions of the methods.

Implementations may include one or more of the following features.

The method may include: upon determining that one or more of the discovered one or more AI assets have unknown identities, extracting natural language text from the collected data; classifying the natural language text into conversational text and non-conversational text; processing the conversational text to determine conversation participants in each conversation in the discovered one or more AI assets; and upon determining that at least one conversation in the discovered one or more AI assets has at least one user and at least one AI agent as conversation participants, confirming one or more AI assets to which the at least one conversation belongs to as AI assets.

The method where extracting the natural language text from the collected data is performed, at least in part, using a regression model.

The method where classifying the text within the extracted natural language text may include using a trained classifier or a trained large language model (LLM).

The method where determining if one or more of the discovered one or more AI assets have unknown identities further include: embedding the collected data using a data processing engine; and performing hybrid similarity to compare the discovered one or more AI assets to previously identified AI assets using a reasoning model.

The method where identities of the previously identified AI assets and their corresponding information are maintained in an unified AI asset inventory.

The method may include: upon determining an identity of a discovered AI asset with an unknown identity, maintaining the identity of the discovered AI asset along with its corresponding information inside an unified AI asset inventory.

The method where an AI asset may include any one of: a tool, a data source, or an other AI asset.

The method where analyzing the collected data corresponding to the discovered one or more AI assets with unknown identities, to determine each of their identities is performed, at least in part, using one or more large language models (LLMs) and a reasoning model.

The method may include: performing data enrichment to collect additional metadata corresponding to the one or more AI assets with unknown identities from one or more external sources using one or more AI agents within an AI discovery engine.

Implementations of the described techniques may include hardware, a method or process, or a computer tangible medium.

In one general aspect, the system may include one or more processors configured to: discover one or more AI assets across a networked environment. The system may furthermore determine if one or more of the discovered one or more AI assets have unknown identities. The system upon determining that one or more of the discovered one or more AI assets have unknown identities, analyze collected data corresponding to the discovered one or more AI assets with unknown identities, to determine each of their identities. Other embodiments of this aspect include corresponding computer systems, apparatus, and computer programs recorded on one or more computer storage devices, each configured to perform the actions of the methods.

Implementations may include one or more of the following features.

The system where the one or more processors are further configured to: upon determining that one or more of the discovered one or more AI assets have unknown identities, extract natural language text from the collected data; classify the natural language text into conversational text and non-conversational text; process the conversational text to determine conversation participants in each conversation in the discovered one or more AI assets; and upon determining that at least one conversation in the discovered one or more AI assets has at least one user and at least one AI agent as conversation participants, confirm one or more AI assets to which the at least one conversation belongs to as AI assets.

The system where extracting the natural language text from the collected data is performed, at least in part, using a regression model.

The system where the one or more processors, when classifying the text within the extracted natural language text, are configured to use a trained classifier or a trained large language model (LLM).

The system where the one or more processors, when determining if one or more of the discovered one or more AI assets have unknown identities, are configured to: embed the collected data using a data processing engine; and perform hybrid similarity to compare the discovered one or more AI assets to previously identified AI assets using a reasoning model.

The system where identities of the previously identified AI assets and their corresponding information are maintained in an unified AI asset inventory.

The system where the one or more processors are further configured to: upon determining an identity of a discovered AI asset with an unknown identity, maintain the identity of the discovered AI asset along with its corresponding information inside an unified AI asset inventory.

The system where an AI asset may include any one of: a tool, a data source, or an other AI asset.

The system where analyzing the collected data corresponding to the discovered one or more AI assets with unknown identities, to determine each of their identities is performed, at least in part, using one or more large language models (LLMs) and a reasoning model.

The system where the one or more processors are further configured to: perform data enrichment to collect additional metadata corresponding to the one or more AI assets with unknown identities from one or more external sources using one or more AI agents within an AI discovery engine. Implementations of the described techniques may include hardware, a method or process, or a computer tangible medium.

In one general aspect, the non-transitory computer-readable medium may include one or more instructions that, when executed by one or more processors of a device, cause the device to: discover one or more AI assets across a networked environment; determine if one or more of the discovered one or more AI assets have unknown identities; and upon determining that one or more of the discovered one or more AI assets have unknown identities, analyze collected data corresponding to the discovered one or more AI assets with unknown identities, to determine each of their identities. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings. In the drawings:

DETAILED DESCRIPTION

Figure 1:
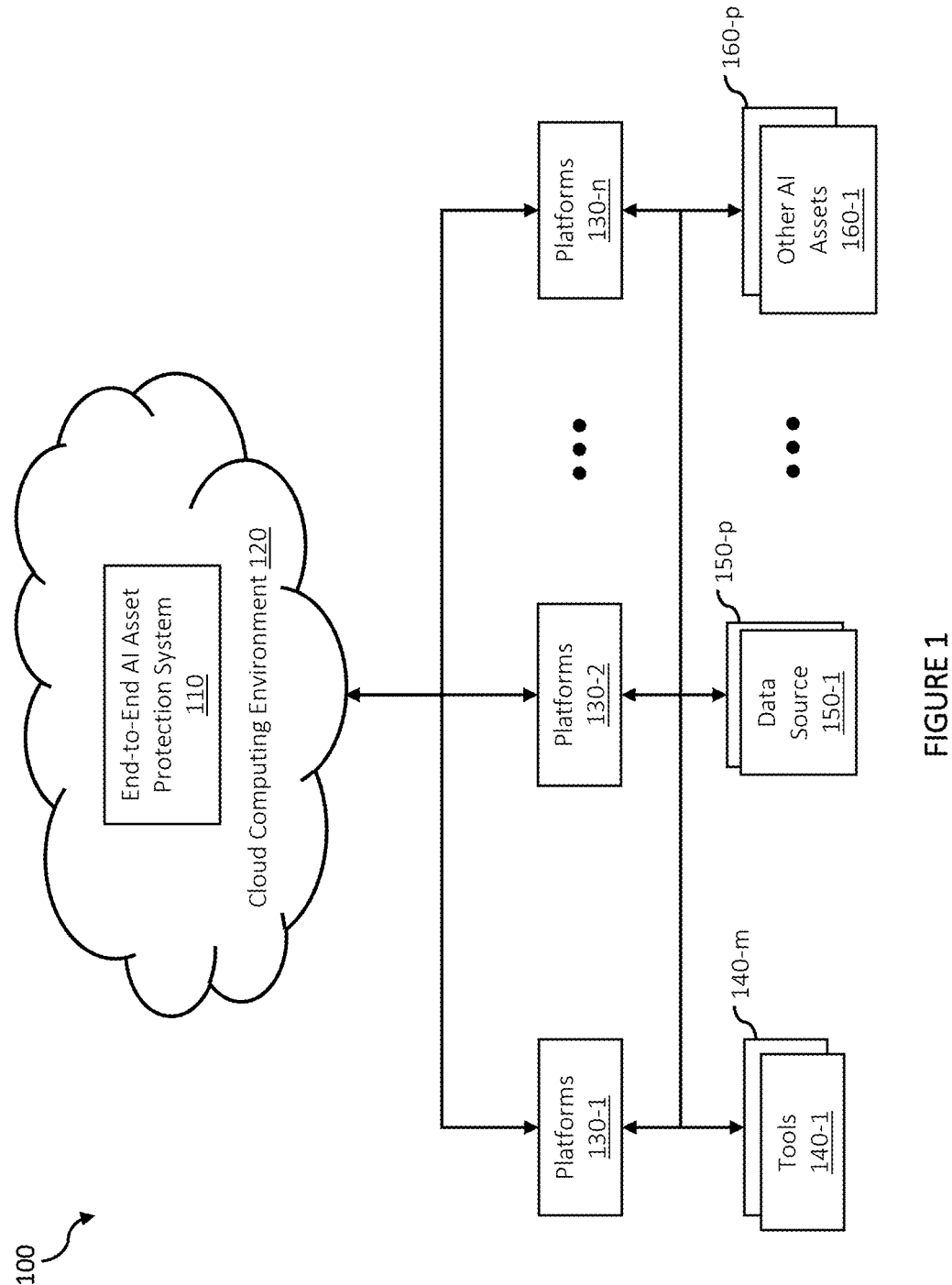
FIG. 1 illustrates an example network diagram utilized to describe various embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments present a method and system for end-to-end AI asset discovery. The method and system can perform AI asset discovery, thereby enabling the discovery of AI assets across an enterprise network, regardless of their deployment origin, location, or operational status. Also, the method and system can integrate with a wide variety of platforms across an enterprise environment, thereby enabling asynchronous extraction of data from all AI agents, workflows, and services, across the environment. Also, the method and system can perform data enrichment to collect additional metadata corresponding to AI assets with unknown identities, thereby enabling the discovery and accurate identification of all AI assets and their features across the environment. Additionally, the method and system can perform cataloging of all discovered AI assets across an environment, thereby providing a foundational inventory upon which governance, compliance, and security controls can effectively be applied.

The disclosed embodiments are operable for any computing architecture and should not be limited to any one architecture discussed herein below.

The disclosed method is not a mental process and cannot be performed entirely in the human mind. Rather, the method involves technical operations that are executed within a computing environment and are tied to specific technological implementations. For example, the method includes dynamically integrating with all platforms in an enterprise environment, asynchronously extracting data about all the platforms within the enterprise environment, and autonomously and continuously discovering and identifying all AI assets deployed across the enterprise environment.

The operation and effectiveness of the method depend on a variety of technical factors, including the number and type of platforms, tools, data sources, AI agents, and other AI assets, within an enterprise environment. The method may dynamically modify its operation based on both the number and types of platforms, tools, data sources, AI agents, and other AI assets, within an enterprise environment, as well as the data that is collected about the AI assets. Such dynamic actions require the use of algorithmic decision-making, network analysis tools, and data processing capabilities, which cannot be mentally performed by a human operator.

Moreover, although a human operator may supply a system prompt and training data to the end-to-end AI asset protection system, the execution of the method remains rooted in automated processing by computing systems. It should be noted that the operator's input may inherently influence certain actions the end-to-end AI asset protection system takes, but the operational steps involved in carrying out the method are performed by the system.

Accordingly, the disclosed method is directed to a practical application of computer technology to solve a specific problem in the fields of cybersecurity and artificial intelligence (AI). It improves the ability to supervise, protect, and govern AI agents and their connected tools and resources within enterprise environments by offering end-to-end discovery and identification of AI assets through technical mechanisms that are necessarily rooted in computing technology.

FIG. 1 illustrates an example network diagram utilized to describe the various disclosed embodiments.

The network diagram 100, also referred to as computing environment 100 or enterprise environment 100, illustrated in FIG. 1 includes an end-to-end AI asset protection system 110, cloud computing environment 120, platforms 130-1, 130-2, 130-*n* (hereinafter, platform 130 in the singular or platforms 130 in the plural), tools 140-1, 140-*m* (hereinafter, tool 140 in the singular or tools 140 in the plural), data sources 150-1, 150-*p* (hereinafter, data source 150 in the singular or data sources 150 in the plural), and other AI assets 160-1, 160-*p* (hereinafter, other AI asset 160 in the singular or other AI assets 160 in the plural), all connected to a network (not shown for purposes of simplicity).

In at least one embodiment, cloud computing infrastructure (not shown for purposes of simplicity) is implemented on the network, and the cloud computing environment 120 is implemented/deployed on top of the cloud computing infrastructure. For example, in an embodiment, cloud computing infrastructure is from one cloud computing provider, such as Amazon® Web Services (AWS), Google® Cloud Services (GCS), Microsoft® Azure, Oracle Cloud®, IBM Cloud®, and the like. In at least one embodiment, a cloud computing environment 120 may be deployed in various configurations, including, but not limited to, public, private, hybrid, or edge-based configurations. In an embodiment, a cloud computing environment 120 is a virtual private cloud (VPC), a virtual network (VNet), a virtual private network (VPN), a combination thereof, and the like. In at least one embodiment, the cloud computing environment 120 is a heterogenous cloud environment. In at least one embodiment, the end-to-end AI asset protection system 110 is located/hosted on the cloud computing environment 120.

Platforms 130 are software environments, containing a plurality of AI assets, which provide tools, infrastructure, and frameworks to train, deploy, and manage AI applications and models. Platforms 130 are located in various locations within the enterprise environment 100. Platforms 130 can be AI platforms, such as Platform as a Service (PaaS), for example, Azure®, and Software as a Service (SaaS), for example SALESFORCE® customer relationship management (CRM) systems, internally developed AI platforms, such as Infrastructure as a Service, (IaaS), for example, AWS® and WIZ®, and third-party AI platforms, such as a system developed and maintained by an external organization, for example, CLAUDE®. More specifically, platforms 130 can include one or more data platforms, cloud platforms, security platforms, AI agent platforms, integration and middleware platforms, application platforms, AI and machine learning platforms, collaboration and productivity platforms, business platforms, and the like, or any combination thereof.

Each platform 130 contains a plurality of AI assets (not explicitly shown in FIG. 1), that are connected to one or more tools 140, one or more data sources 150, and one or more other AI assets 160, or any combination thereof. In at least one embodiment, AI assets can include other AI assets not explicitly named or depicted in FIG. 1.

Tools 140, such as native tools, MCP tools, and API tools, are software components, frameworks, and utilities that enable the creation, training, deployment, interactions, and management of AI systems, for example, GMAIL and SLACK®. Tools 140 can include data management tools, model development tools, infrastructure and compute tools, model deployment and serving tools, security, governance, and compliance tools, AI application layer tools, and the like.

Data sources 150 are repositories from which information is collected, accessed, or generated for use in training, test, and operating AI systems, such as web extensions, for example, CHROME® and MICROSOFT EDGE®, existing security stacks, CROWDSTRIKE®, analytics platforms, for example, DATABRICKS®, and databases, for example, SNOWFLAKE®, and the like.

Other AI assets 160 are any component used in the development, deployment, or operation of an AI system, besides tools 140 and data sources 150. Specifically, other AI assets 160 include autonomous or semi-autonomous computational entities, i.e., AI agents, configured to perform one or more cognitive, analytical, or generative tasks through the application of machine learning, reasoning, or other artificial intelligence techniques, as well as tools or resources that use AI to perform a specific function, such as data assets, for example, data pipelines and associated data structures, platform/software and infrastructure assets, for example, data storage systems and development platforms, executable code, one or more trained machine learning models, operational logic enabling perception, inference, decision-making, and action within a defined environment, and the like. The other AI assets 160 may further include capabilities for self-adaptation, goal-oriented behavior, and interaction with additional AI assets or external systems via defined interfaces or communication protocols. In certain embodiments, the other AI assets 160 may operate independently or as part of a multi-agent system, wherein a plurality of AI assets cooperate, compete, or coordinate to achieve complex objectives. Each other AI asset 160 may encapsulate specialized functions, such as language understanding, reasoning, planning, control, or prediction, and may maintain a persistent state or memory reflective of its operational context.

As used herein, the terms "AI asset", in the singular, and "AI assets", in the plural, include tools 140, data sources 150, and other AI assets 160.

End-to-end AI asset protection system 110, also referred to as system 110, is an agentic AI system, i.e., a class of AI systems configured to monitor, govern, and, if needed, intervene in the behavior of other AI agents/assets, effectively acting as an oversight, alignment, and safety layer in agentic AI ecosystems. System 110 is configured to autonomously discover and classify all AI assets across an enterprise environment 100.

System 110 is configured to collect data from platforms 130 through various connections, as described below. The system 110 can ingest data, such as metadata, runtime data, and configuration and system data, from platforms 130 through various read-only integrations, telemetry, and the like. Runtime data includes active, or content-level, data generated in real time, for example, messages, documents, chat transcripts, event payloads, and the like. Metadata includes structured data about the runtime content, for example, message IDs, timestamps, sender names, file names, owners, modification dates, calendar event times, and the like. Configuration data includes settings that define how an application or system behaves, for example, integration settings, workflow definitions, API keys, schema info, and the like. System data includes operational data generated by the system itself, for example, caches, temporary files, backups, and the like. Additionally, the system 110 can perform data enrichment to collect additional metadata corresponding to AI assets with unknown identities using web crawling, similarity searching, and reasoning-based inferences.

In at least one embodiment, system 110 is connected to AI platforms 130 using integrations via application programming interfaces (APIs). In at least one embodiment, system 110 is connected to internally developed AI platforms 130 through a gateway layer using a software development kit (SDK) or proxy. In at least one embodiment, system 110 is connected to third party AI platforms 130 through a model context protocol (MCP) gateway using a proxy.

In at least one embodiment, system 110 is realized as an MCP server, and AI platforms 130 are realized as MCP clients.

System 110 is further configured to autonomously discover and classify all AI assets across an enterprise environment 100. Specifically, in an embodiment, system 110 invokes an AI discovery engine (not shown in FIG. 1) to autonomously identify, match, and enrich AI assets across heterogeneous environments, as well as insert them into a continually updated unified AI asset inventory for governance. As previously stated, system 110 supports integration with a wide variety of platforms 130, and each integration asynchronously extracts metadata about AI agents, workflows, services, and the like, within a platform 130. As AI assets are discovered, system 110 can embed the assets and compare them against existing inventory items using hybrid similarity, ensuring accurate correlation despite potential naming inconsistencies, duplicates, or contextual variations. Additionally, system 110 can standardize collected data to a unified schema, and autonomously gather additional metadata, such as SOC 2 status, data residency, model training policy, company HQ, compliance posture, etc., using AI agents to perform enrichment.

Embodiments performed by system 110 and its modules and layers (not shown in FIG. 1) are discussed in more detail below. The modules of the end-to-end AI asset protection system 110 can be implemented in software (as defined herein below), firmware, hardware, or any combination thereof. Such implementations may vary depending on performance requirements, computational constraints, deployment contexts (e.g., edge vs. cloud), or other architectural considerations. It should be understood that various embodiments discussed herein are presented for purposes of illustration and description, and that the disclosed embodiments should not be limited to any one or more embodiments discussed herein.

It should be noted that although one end-to-end AI asset protection system 110 is illustrated in FIG. 1 for the sake of simplicity, the embodiments disclosed herein can be applied to a plurality of instances of the end-to-end AI asset protection system 110 per enterprise.

Figure 2:
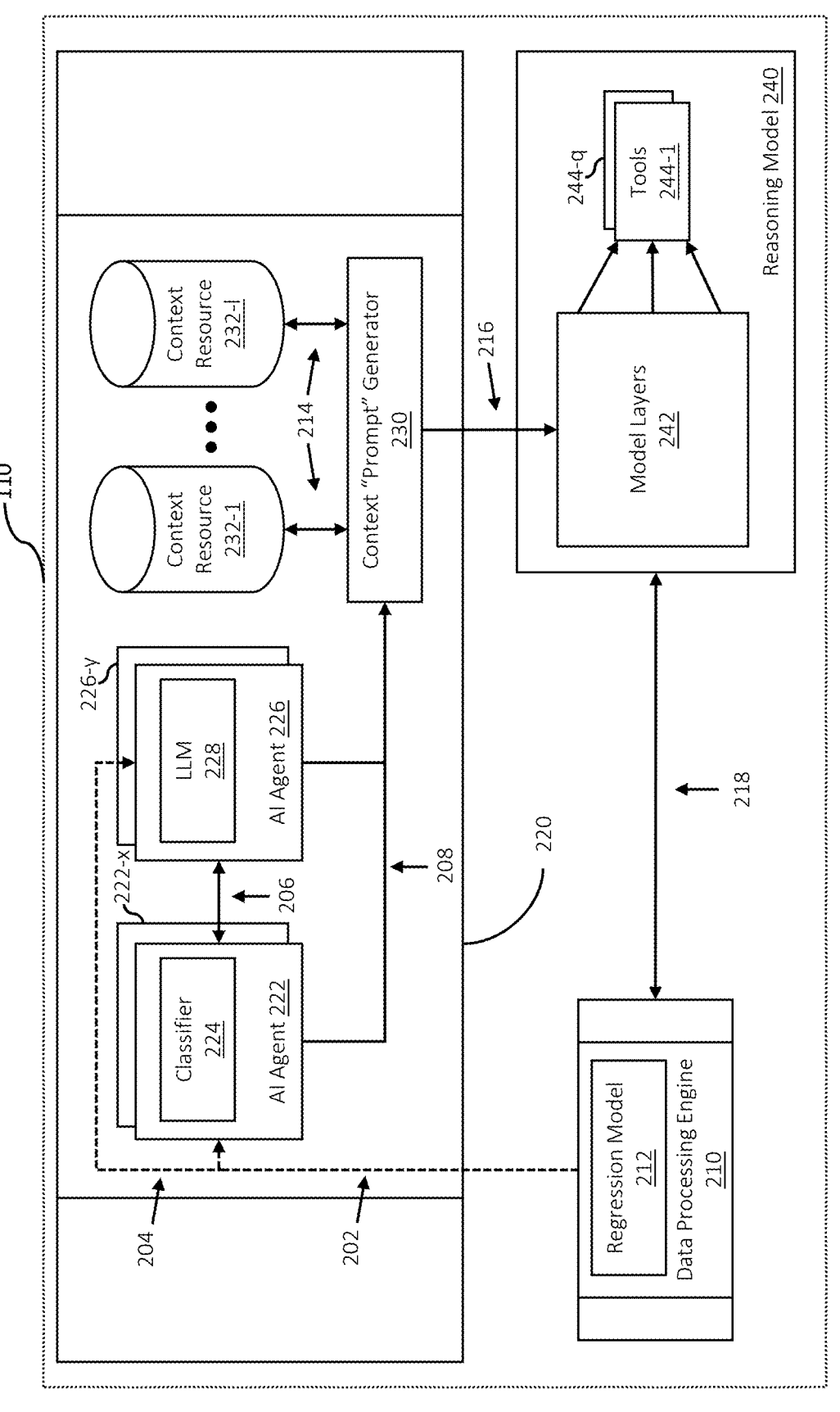
FIG. 2 is a functional diagram of an end-to-end AI asset protection system according to at least one embodiment.

FIG. 2 is an example functional diagram of the end-to-end AI asset protection system 110 according to an embodiment. As illustrated in FIG. 2, the end-to-end AI asset protection system 110 can include, but is not limited to, a data processing engine 210, an AI discovery engine 220, and a reasoning model 240. The data processing engine 210 can include one or more trained machine learning models 212 (only one shown for purposes of simplicity), such as one or more trained regression models 212, for example, a trained neural regression model. The reasoning model 240 can include model layers 242 and tools 244-1, 244-q (hereinafter, tool 244 in the singular or tools 244 in the plural).

Data processing engine 210 is a computation component of system 110 that ingests raw data, i.e., data that has been collected but not yet processed, cleaned, or analyzed, received from both internal and external data sources, executes operations on the data, such as filtering, sorting, and aggregating, to prepare the data for analysis, and orchestrates the data respectively downstream to AI discovery engine 220 for analysis. Additionally, data processing engine 210 stores data, such as previously processed collected data. As previously stated, the data processing engine 210 can include one or more trained regression models 212, herein referred to as regression model 212. The regression model 212 can be configured (i.e., trained and fine-tuned) to perform one or more data processing tasks, such as semantic classification and tagging or batch embedding generation. For example, regression model 212 can analyze ingested data using stored natural language indicators, such as sentiment indicators, intent markers, engagement indicators, and the like, learned during the training process, to extract natural language text from the ingested data.

AI discovery engine 220 can be a reasoning engine. AI discovery engine 220 is configured (e.g., trained) to perform "AI asset discovery". AI asset discovery includes analyzing data received from a data processing engine 210, generating prompts related to autonomously discovering and classifying all AI assets across an enterprise environment 100 (FIG. 1), and feeding the generated prompts to the reasoning model 240 for processing the generated prompts. The AI discovery engine 220 can include AI agents 222, 222-x, hosting one or more trained machine learning models 224, such as one or more trained classifiers 224, validated using one or more validation techniques (hereinafter, AI agents 222 in the singular or AI agents 222 in the plural), AI agents 226, 226-y, hosting one or more trained machine learning models 228, such as one or more trained LLMs 228, validated using one or more validation techniques (hereinafter, AI agent 226 in the singular or AI agents 226 in the plural), a context "prompt" generator 230, and context resources 232-1, 232-1 (hereinafter, context resource 232 in the singular or context resources 232 in the plural). Additionally, AI agents 222, 226 include tools (not shown for purposes of simplicity), such as one or more tools used for gathering, processing, and enriching metadata across system 110. In at least one embodiment, AI agents 222, 226 can communicate with each other, as indicated by double-sided arrow 206.

The trained classifiers 224, herein referred to as classifier 224, can be a logistic regression, linear discriminant analysis (LDA), decision trees, random forest, support vector machine (SVM), k-nearest neighbor (KNN), naive bayes, or neural network, that can input text and perform text classification, for example deciding whether input text is or is not part of a conversation. In at least one embodiment, classifier 224 can be an LLM.

The trained LLMs 228, herein referred to as LLM 228, can be trained on extensive corpora of text data using unsupervised, supervised, or reinforcement learning techniques. Examples include encoder-only architectures (e.g., BERT-type models), decoder-only architectures (e.g., GPT-type models), or encoder-decoder architectures (e.g., T5-type or BART-type models). In at least one embodiment, the LLM 228 can include a classifier.

The context "prompt" generator 230 is a component that creates or refines prompts, i.e., the text inputs that guide how a model produces its responses. Specifically, the context "prompt" generator 230 assists system 110 in generating the best possible instruction(s) before passing data to reasoning model 240. Context resources 232 include internal sources, such as enterprise-specific sources, and external information sources, such as up-to-date public information from the internet.

AI agent 222 can receive 202 processed data, e.g., natural language text, from the data processing engine 210. Upon receiving the processed data, the AI agent 222, using its classifier 224, classifies the natural language text into conversational text and non-conversational text. Conversational text can include text indicating properties or dynamics about a conversation, such as turn-taking behavior, agreement/disagreement, topic shifts, and the like. The AI agent 222 feeds 208 the relevant classified data to the context "prompt" generator 230. Upon receiving the relevant classified data, for example, text pulled from an email sent by a user, the context"prompt" generator 230 queries 214 one or more context resources 232 to access information, such as information learned through historical data or learned information through the most recent analyzed data, needed to generate contextually relevant prompts corresponding to the data it was fed. Using the classified data, information pulled 214 from the context resources 232, for example, the identity of the user who sent the email, what website the user is accessing, and what time of day the email was sent, along with a pre-defined system prompt, the context "prompt" generator 230 generates a contextually relevant prompt, for example, "Is this a human talking with an AI-powered application or a human talking with another human?" The context "prompt" generator 230 feeds 216 the generated prompt and the classified data to the trained reasoning model 240 for processing.

AI agent 226 can receive 204 processed collected data from the data processing engine 210. Upon receiving 218 results indicating that at least part of the embedded collected data does not match the embedded data representing discovered AI assets maintained within the AI asset inventory, the data processing engine 210 can send the processed collected data to AI agents 226 to analyze the data. The AI agents 226, using their LLMs 228, can analyze the collected data and feed 208 the output analyzed data to the context "prompt" generator 230. Upon receiving the analyzed data, the context" prompt" generator 230 queries 214 one or more context resources 232 to access information, such as information learned through historical data or learned information through the most recent analyzed data, needed to generate contextually relevant prompts corresponding to identifying the one or more AI assets represented in the analyzed data. Using the analyzed data, information pulled 214 from the context resources 232, along with a pre-defined system prompt, the context "prompt" generator 230 generates a contextually relevant prompt, for example, "Based on the analyzed data, identify one or more AI agents." The context "prompt" generator 230 feeds 216 the generated prompt and the analyzed data to the reasoning model 240 for processing.

The trained reasoning model 240, herein referred to as reasoning model 240, can be a trained language model, such as a trained LLM. Model layers 242 can include the layers of the reasoning model 240, such as a perception layer, memory layer, reasoning layer, and an orchestration layer. In an embodiment, a language model may include various types and architectures, each configured to process, generate, or analyze natural language data. Such models can include, without limitation, statistical language models (e.g., n-gram models, hidden Markov models), neural network-based models (e.g., recurrent neural networks, long short-term memory (LSTM) networks, gated recurrent units (GRUs)), and transformer-based models that employ self-attention mechanisms. In certain embodiments, the language model may comprise a large language model (LLM) trained on extensive corpora of text data using unsupervised, supervised, or reinforcement learning techniques. Examples include encoder-only architectures (e.g., BERT-type models), decoder-only architectures (e.g., GPT-type models), or encoder-decoder architectures (e.g., T5-type or BART-type models). The system may further incorporate multimodal language models capable of processing both textual and non-textual data (e.g., images, audio, or structured data), or domain-specific language models fine-tuned for specialized applications such as legal, medical, or technical content analysis. Additionally, the reasoning model 240 can include a unified AI asset inventory (not shown). A unified AI asset inventory can be a repository used for maintaining the identity and corresponding information of all discovered AI assets, such as the embeddings of the collected data representing an AI asset, such as an asset's identity, description, system prompt, connected tools 140, connected data sources 150, connected AI assets 160, and access controls, e.g. public/private, authenticated, communication channels, e.g.

Microsoft Teams®, WhatsApp®, API endpoints. As AI assets are discovered by system 110, their identity and corresponding information can be inserted into the continually updated unified AI asset inventory.

The reasoning model 240 may be implemented using a variety of computational architectures and frameworks designed to perform logical inference, problem solving, or decision-making based on structured or unstructured data. Such models can include, without limitation, symbolic reasoning systems (e.g., rule-based engines, knowledge graphs, expert systems), probabilistic reasoning models (e.g., Bayesian networks, Markov logic networks, probabilistic graphical models), and neural reasoning models that utilize deep learning architectures to approximate logical relationships. In certain embodiments, the reasoning model 240 may employ neuro-symbolic approaches that integrate neural networks with symbolic reasoning components to achieve explainable and generalizable inference. The reasoning model 240 may further include chain-of-thought, program-of-thought, or retrieval-augmented reasoning mechanisms configured to generate intermediate logical steps or to incorporate external knowledge sources dynamically during inference. Additionally, hybrid reasoning frameworks may combine statistical inference with deterministic rule evaluation to enhance robustness, interpretability, and adaptability across diverse application domains.

Additionally, regression model 212, classifier 224, and LLM 228, may be implemented using a variety of computational architectures and frameworks, as described above.

The reasoning model 240 is configured to receive contextually relevant prompts. The reasoning model 240 is further configured (i.e., trained, fine-tuned, and validated) to execute the prompt to generate an internal thought state that encapsulates context, goals, and possible actions. Based on the generated internal thought state, the reasoning model 240 determines an action or action sequence intended to be performed by system 110. The actions may involve calling tools 244. When calling a tool 244, the reasoning model 240 is configured to generate a structured call, e.g., JSON, that includes parameters describing the action to be performed.

The reasoning model 240 is further configured to process a system prompt, a generated contextually relevant prompt, and analyzed data to determine one or more identities of AI assets represented in the analyzed data, in the same method as previously described above.

Additionally, the reasoning model 240 is further configured to receive 218 embedded collected data from the data processing engine 210. The reasoning model 240, using its tools 244, can perform hybrid similarity to compare and potentially match embedded collected data to embedded data representing discovered AI assets maintained within the AI asset inventory. Hybrid similarity combines the performance of both vector similarity and metadata matching. Upon completing the performance of the hybrid similarity, the reasoning model 240 can return 218 the results to the data processing engine 210.

Tools 244 are configured to execute a query/action, in response to a structured call, and return a result. Once tool 244 executes the query/action, e.g., run Python, search documents, query APIs, and subsequently, returns a result, the result is re-ingested by the reasoning model 240 along with the prior context, allowing the reasoning model 240 to update its internal thought state and thus, synthesize a final answer. The reasoning model 240 is further configured to generate a final response based on the initial reasoning produced by the reasoning model 240 and the result of one or more interactions with tools 244. In at least one embodiment, this thought-reasoning-action-response cycle of the reasoning model 240 may repeat multiple times if the problem requires iterative reasoning and/or the use of multiple tools 244.

Figure 5:
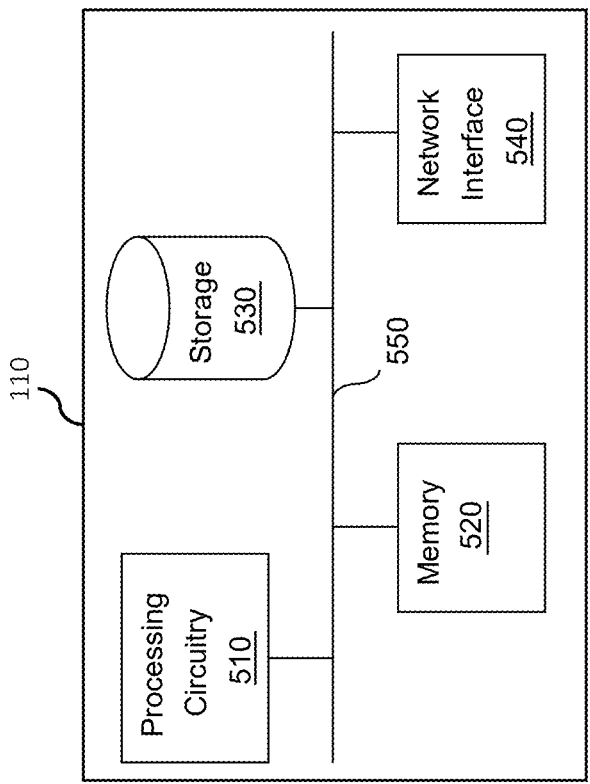
FIG. 5 is a block diagram of a computing architecture of an end-to-end AI asset protection system according to at least one embodiment.

It should be noted that the end-to-end AI asset protection system 110 and any of its modules 210, 220, and layers 240, 242 may be realized as a piece of software code. End-to-end AI asset protection system 110 may be realized often as just-in-time compiled software code. As used herein, the term "software" refers to one or more sequences of instructions, logic, or routines, including but not limited to source code, object code, intermediate code, interpretable code, or executable code, that may be stored on a non-transitory computer-readable medium and executed by one or more processors. The software may be implemented using one or more machine learning frameworks, including but not limited to TensorFlow™, PyTorch™, ONNX™, or equivalent platforms. The software may be executed in virtualized environments, such as containers or serverless architectures, or may be deployed via cloud infrastructure. The term "hardware" refers to one or more physical computing devices or components capable of performing operations, including model training, inference, and/or data processing. Non-limiting examples of hardware include: Central Processing Units (CPUs); Graphics Processing Units (GPUs); Tensor Processing Units (TPUs); Application-Specific Integrated Circuits (ASICs); Field Programmable Gate Arrays (FPGAs); Neural Processing Units (NPUs) or equivalent dedicated AI accelerators; On-device microcontrollers or edge processors capable of running trained models, and the like. The described embodiments are not limited to any particular implementation platform and may be deployed across heterogeneous environments comprising combinations of the above. An example hardware layer implementation of the end-to-end AI asset protection system 110 in hardware is shown in FIG. 5.

Figure 3:
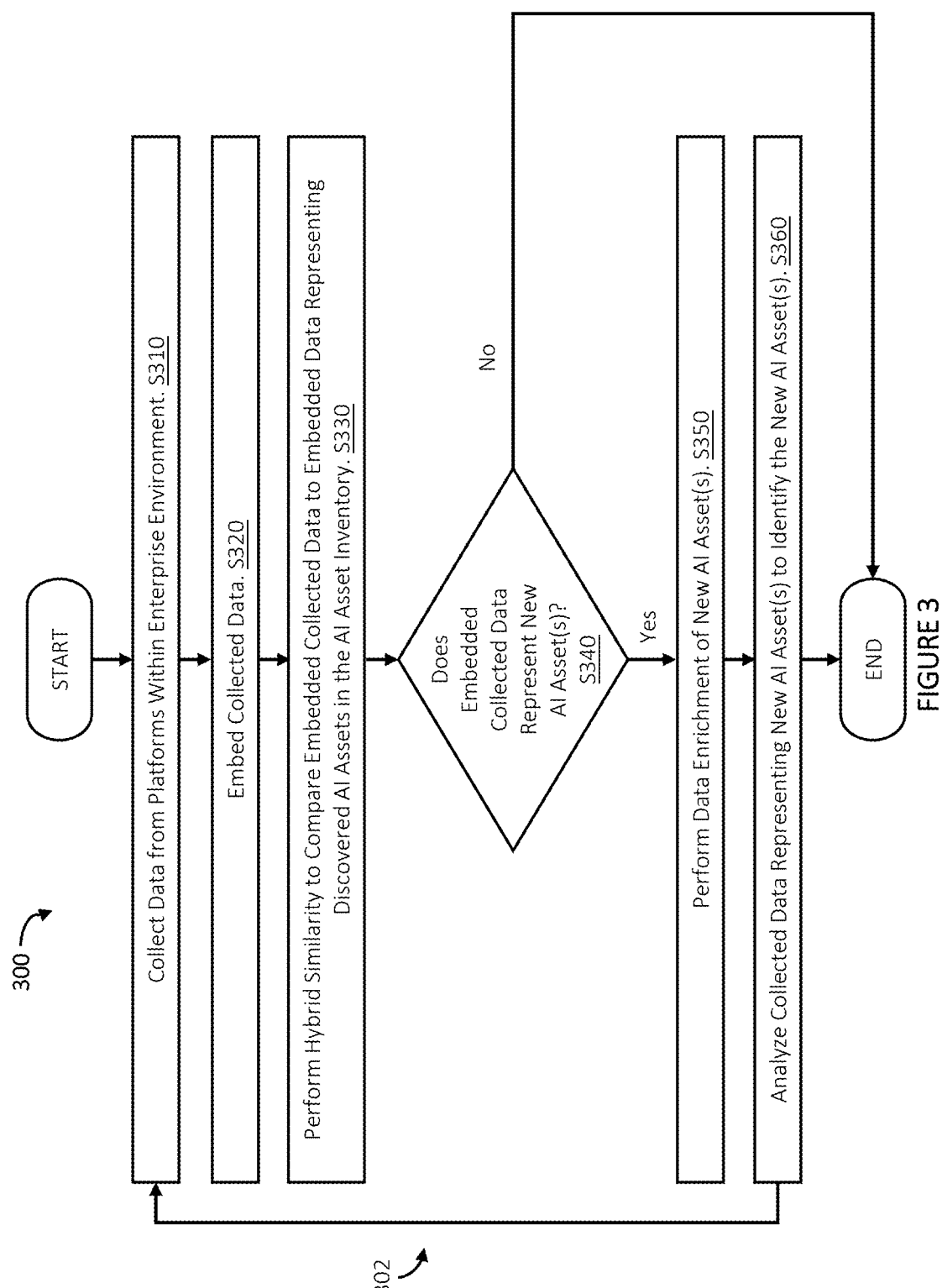
FIG. 3 is an operational flowchart illustrating a process for end-to-end AI asset discovery according to at least one embodiment.

FIG. 3 is an operational flowchart diagram illustrating a method 300, also referred to as process 300, for end-to-end AI asset discovery according to at least one embodiment. In some embodiments, the method may be performed by a system, such as end-to-end AI asset protection system 110 shown in FIGS. 1 and 2. The method is executed to autonomously discover, classify, and inventory, all AI assets across an enterprise environment 100. The method will be discussed with reference to the elements shown in FIGS. 1 and 2.

At S310, data is collected from platforms 130 within an enterprise environment 100 through various connections. As previously stated, data, such as metadata, runtime data, and configuration and system data, are ingested from platforms 130 through various read-only integrations, telemetry, and the like.

At S320, the collected data is embedded using the data processing engine 210. The data processing engine 210 can filter, sort, and aggregate the collected data, such as by aggregating collected data into subgroups based on the type of AI asset that the data represents, such as an AI agent, or AI assets that are interconnected, and subsequently, embed the collected data. Specifically, the regression model 212 can process the collected data to perform batch embedding generation, and thus, compute vector representations of the collected data.

At S330, hybrid similarity can be performed to compare the embedded collected data representing the AI assets to embedded data representing previously discovered AI assets that are already maintained within the unified AI asset inventor. Specifically, hybrid similarity includes performance of vector similarity, such as by using approximate nearest neighbors (ANNs) algorithms with a bi-encoder model retrieval over embeddings to retrieve top-k candidates, and using a cross-encoder to create a relevance score for each of the top-k candidates, during which metadata signals are incorporated, thereby capturing the semantic/contextual likeness from the embedded representations. Additionally, hybrid similarity further comprises performance of metadata matching using various algorithms, such as string and pattern matching, hashing and fuzzy hashing, graph and entity resolution algorithms, machine learning/NLP-based matching, as well as rule-based and hybrid approaches, thereby capturing structured and factual alignment from explicit fields. More specifically, the reasoning model 240 can perform hybrid similarity to merge semantic closeness and metadata consistency, and thereby reach a true-match decision, hereinafter referred to as a match. A match indicates that the embedded collected data is from one or more already discovered AI assets. If there is no match, the embedded collected data is from one or more unidentified AI assets, and the embedded collected data needs to be analyzed to confirm the identities of the assets, i.e., "discover" them. Specifically, the data processing engine 210 can send 218 the collected embedded data to the reasoning model 240. The reasoning model 240 can process the collected embedded data through its model layers 242 to perform hybrid similarity.

At S340, it is determined whether the embedded collected data represents one or more new AI assets, or whether there is potential that the embedded collected data represents one or more new AI assets. According to at least one implementation, if the embedded collected data represents one or more new AI assets, i.e., one or more of the AI assets represented in the embedded collected data have unknown identities, meaning their identities and corresponding information are not yet maintained in the unified AI asset inventory (S340, "YES" branch), execution proceeds with S350. According to at least one implementation, if the embedded collected data potentially represents one or more new AI assets (S340, "YES" branch), execution proceeds with S350. In at least one embodiment, it is determined that embedded collected data represents one or more new AI assets based on the output from the reasoning model 240 in S330, i.e., no determination of a match. In at least one embodiment, it is determined that embedded collected data could potentially represent one or more new AI assets based on the output from the reasoning model 240 in S330, i.e., no determination of a match but more metadata is needed for analysis to confirm. According to at least one implementation, if embedded collected data does not represent at least one new AI asset, i.e., all of the AI assets represented in the embedded collected data have known identities, meaning their identities and corresponding information are maintained in the unified AI asset inventory (S340, "NO" branch), execution ends.

At S350, data enrichment is performed on the collected data representing the new AI asset(s). Data enrichment can be performed by collecting additional metadata corresponding to AI assets with unknown identities from one or more external sources to obtain one or more identification features of the one or more new AI assets. In such an embodiment, one or more AI agents 226 can be used to perform data enrichment using various techniques through one or more of the AI agents' 226 tools, such as web crawling, similarity searching, and reasoning-based inferences. In at least one embodiment, performance of S350 is optional, and dependent on the output of S330, indicating that embedded collected data could potentially represent one or more new AI assets. In such an embodiment, after performance of S350, execution proceeds back to S340 (not shown). Additionally, in such an embodiment, after performance of S340, execution proceeds to S360.

At S360, the collected data representing the new AI asset(s) is analyzed to identify the new AI asset(s). Upon receiving results indicating that at least part of the embedded collected data does not match embedded data representing discovered AI assets maintained within the AI asset inventory, the data processing engine 210 can send the collected data to AI agents 226 within the AI discovery engine 220 to analyze the data, such as the network data and runtime interactions represented in the processed collected data. Specifically, the AI agents 226, using their LLMs 228 and tools, can obtain identification features, such as an asset identity, description, system prompt, connected tools 140, connected data sources 150, connected AI assets 160, and access controls, e.g. public/private, authenticated, communication channels, e.g. Microsoft Teams®, WhatsApp®, API endpoints, of one or more AI assets represented in the processed collected data.

Upon obtaining the identification features of the one or more AI assets represented in the processed collected data, i.e., the analyzed data, the AI agents 226 can feed 208 the analyzed data to the context "prompt" generator 230. Upon receiving the analyzed data, the context"prompt" generator 230 queries 214 one or more context resources 232 to access information, such as information learned through historical data or learned information through the most recent analyzed data, needed to generate contextually relevant prompts corresponding to identifying the one or more AI assets represented in the analyzed data. Using information pulled 214 from the context resources 232, along with a pre-defined system prompt, the context "prompt" generator 230 generates a contextually relevant prompt. The context "prompt" generator 230 feeds 216 the system prompt, the generated contextually relevant prompt, and the analyzed data to the reasoning model 240 for processing.

The reasoning model 240 can process the system prompt, the generated contextually relevant prompt, and the analyzed data, to identify, i.e., "discover", the one or more AI assets represented in the analyzed data. Additionally, upon being discovered, the reasoning model 240 can add an AI asset's identity and corresponding data within the unified AI asset inventory.

In at least one embodiment, detecting one or more AI assets requires performance of method 300 multiple times before each AI asset in an enterprise environment 100 is able to be accurately detected.

In at least one embodiment, performance of the end-to-end AI asset discovery method 300 operates as an iterative control loop, as represented by arrow 302, that repeatedly executes in a defined order.

In at least one embodiment, AI asset discovery 300 runs continuously. In at least one embodiment, AI asset discovery 300 runs on a schedule. In at least one embodiment, AI asset discovery 300 is retriggered by new events.

Although FIG. 3 shows example blocks of the method 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
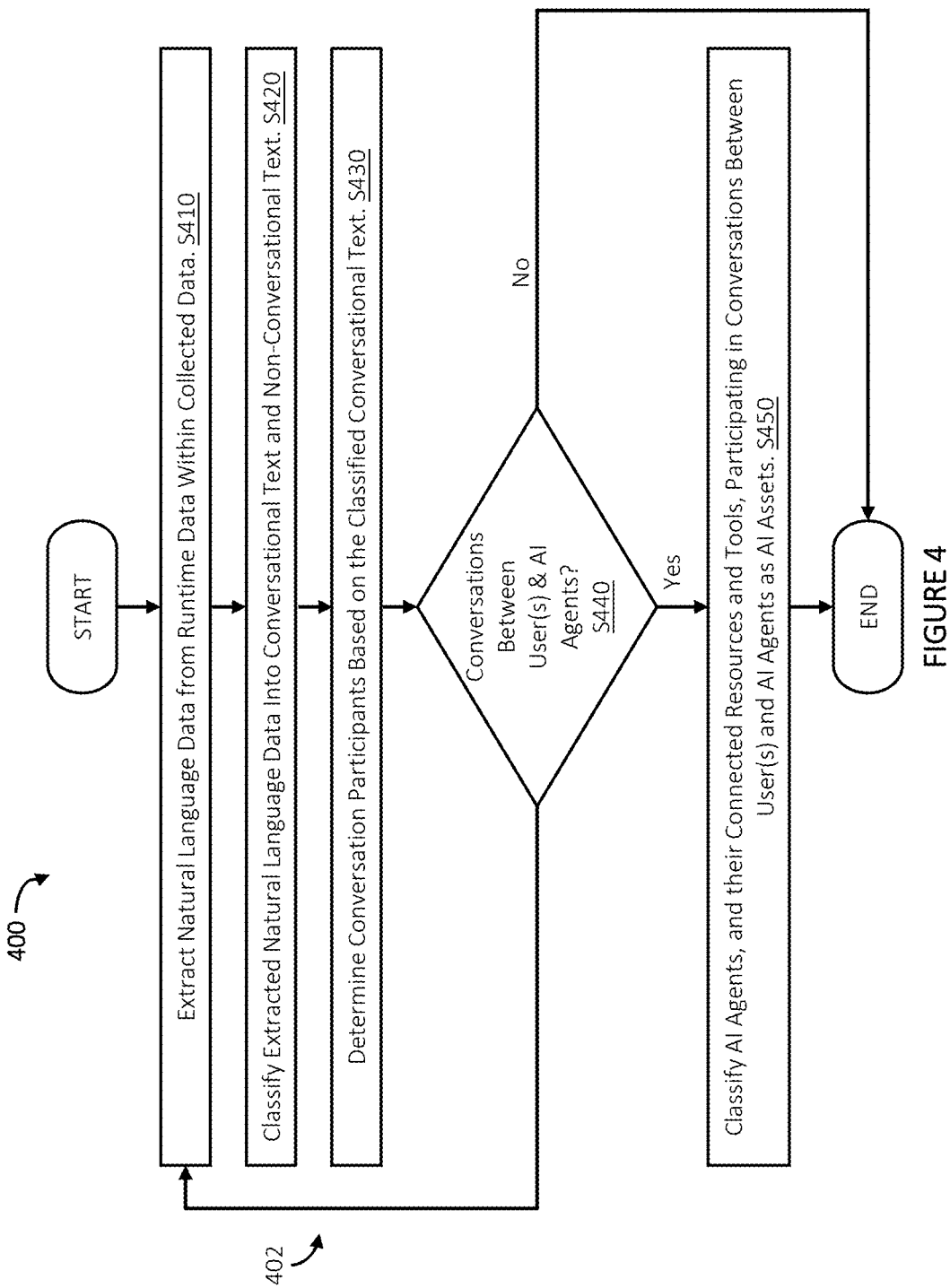
FIG. 4 is an example flowchart illustrating a process for end-to-end AI asset runtime discovery according to at least one embodiment.

FIG. 4 is an example flowchart diagram illustrating a method 400, also referred to as process 400, for end-to-end AI asset runtime discovery, according to at least one embodiment. In some embodiments, the method may be performed by a system, such as the end-to-end AI asset protection system 110 shown in FIGS. 1 and 2. The method is executed to autonomously confirm all interactions between AI assets within an LLM-powered application. The method will be discussed with reference to the elements shown in FIGS. 1, 2, and 3.

At S410, natural language text is extracted from the runtime data within the collected data, as performed in S310, using the data processing engine 210, and more specifically, the regression model 212 within the data processing engine 210. The regression model 212 can analyze the collected data using stored natural language indicators, such as sentiment indicators, intent markers, engagement indicators, and the like, learned during the training process, to extract conversational data from the data.

At S420, the extracted natural language text is classified into conversational text and non-conversational text. In at least one embodiment, the natural language text can be classified using classifier 224 hosted by at least one AI agent 222 within the AI discovery engine 220. In at least one embodiment, the natural language text can be classified using LLM 228 hosted by at least one AI agent 226 within the AI discovery engine 220. As previously stated, conversational data can include text from a conversation, such as dialogue transcripts, chat messages, interviews, Q&A threads, customer server chats, and the like, indicating properties or dynamics about a conversation, such as turn-taking behavior, agreement/disagreement, topic shifts, and the like. Non-conversational text may include text that is not likely to be part of a conversation, such as titles, news articles, product descriptions, reports, and the like. Specifically, the classifier 224 can process the input extracted conversational text and determine which parts of the text are, and are not, part of a conversation.

At S430, the conversation participants are determined based on the classified conversational text. More specifically, the conversational text is processed using the reasoning model 240 to determine the conversation participants. Upon output of conversational text from the classifier 224 or LLM 228, the host AI agent(s) 222 or 224, feed the conversational text to the context "prompt" generator 230. The context"prompt" generator 230 can query 214 one or more context resources 232 to access information, such as historical information, the full context of the packet(s) from which the conversation text came, or the source of the conversations, needed to generate contextually relevant prompts corresponding to the conversational text. Using information pulled 214 from the context resources 232, along with a pre-defined system prompt, the context "prompt" generator 230 generates a contextually relevant prompt. The context "prompt" generator 230 can feed the system prompt, the generated contextually relevant prompt, and the classified conversational text to the reasoning model 240 for processing. The reasoning model 240 can process the system prompt, the generated contextually relevant prompt, and the classified conversational text through its model layers 242 to determine what conversations comprise interactions between at least one user and at least one AI agent, and what conversations do not comprise interactions between a user and an AI agent, such as conversations only comprising interactions between one or more users.

At S440, it is determined whether any of the conversations include interactions between user(s) and AI agent(s). According to at least one implementation, if one or more of the conversations include interactions between at least one user and at least one AI agent (S440, "YES" branch), execution proceeds with S450. In at least one embodiment, it is determined that a conversation includes interactions between a user and an AI agent based on the output from the reasoning model 240 in S430, i.e., confirmation of at least one such interaction. According to at least one implementation, if none of the conversations consist of interactions between at least one user and at least one AI agent (S440, "NO" branch), execution ends.

In at least one embodiment, it may be determined that more data/information is needed before a confirmation can be made as to whether or not a conversation includes interactions between a user and an AI asset. In such an embodiment, method 400 proceeds to S410, as represented by arrow 402, to extract additionally collected metadata, as collected in the same manner as described in S310, followed by S420, and S430. Additionally, in such an embodiment, two or more of the blocks of process 400 may be performed in parallel, for example, S410 and S450.

At S450, upon determining that one or more conversations consist of interactions between user(s) and AI agent(s), the corresponding LLM-powered application, i.e., the web browser in this case, its AI agents, and its connected resources 150, 160, and tools 140, can all be classified as AI assets. Upon classifying one or more newly discovered AI assets, the AI asset inventory can be updated with the one or more newly discovered AI assets and their corresponding data.

Although FIG. 4 shows example blocks of the method 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is an example block diagram of a computing architecture of the end-to-end AI asset protection system 110.

The end-to-end AI asset protection system 110 includes a processing circuitry 510 coupled to a memory 520, a storage 530, and a network interface 540. In an embodiment, the components may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

In at least some embodiments, the processing circuitry 510 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 510 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In embodiments which utilize large language models (LLMs) or otherwise perform operations which may require or be enhanced through use of parallel processing, the processing circuitry 510 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors during attention weight computation. In at least some such embodiments using GPUs, the processing circuitry 510 may include a number of CPU cores which is equal to or greater than the number of GPUs in order to facilitate or otherwise support parallel processing via multiple GPUs.

The memory 520 may be volatile (e.g., RAM, etc.), non-volatile (e.g., ROM, flash memory, etc.), or any combination thereof. In one configuration, computer-readable instructions needed to implement one or more embodiments disclosed herein may be stored in the storage 530.

In another embodiment, the memory 520 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), hard drives, SSD, or any other medium which can be used to store the desired information, such as log of transactions, public keys, and so on. The storage 530 may include code for executing end-to-end AI asset discovery.

The network interface 540 allows the end-to-end AI asset protection system 110 to communicate with the Internet or a local area network. The network interface 540 communicates with these elements.

It should be understood that the embodiments described herein are not limited to the specific architecture illustrated in FIG. 5 and that other architectures may be equally used without departing from the scope of the disclosed embodiments.

It should be further noted that the end-to-end AI asset protection system 110 may be realized using a computing architecture similar to the architecture illustrated in FIG. 5, but that other architectures may be equally used without departing from the scope of the disclosed embodiments. Further, the memory 520 may include instructions for executing the function of the respective device.

The various embodiments disclosed herein can be implemented as any combination of hardware, firmware, and software. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a micro-instruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the groups consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for end-to-end artificial intelligence (AI) asset discovery, comprising:

discovering one or more AI assets across a networked environment;

determining if one or more of the discovered one or more AI assets have unknown identities;

upon determining that one or more of the discovered one or more AI assets have unknown identities, analyzing collected data corresponding to the discovered one or more AI assets with unknown identities, to determine each of their identities;

upon determining that one or more of the discovered one or more AI assets have unknown identities, extracting natural language text from the collected data;

classifying the extracted natural language text into conversational text and non-conversational text;

processing the conversational text to determine conversation participants in each conversation in the discovered one or more AI assets; and upon determining that at least one conversation in the discovered one or more AI assets has at least one user and at least one AI agent as conversation participants, confirming one or more AI assets to which the at least one conversation belongs to as AI assets.

2. The method of claim 1, wherein determining if one or more of the discovered one or more AI assets have unknown identities further comprises:

embedding the collected data using a data processing engine; and performing hybrid similarity to compare the discovered one or more AI assets to previously identified AI assets using a reasoning model, wherein hybrid similarity combines vector similarity and metadata matching.

3. The method of claim 2, wherein identities of the previously identified AI assets and their corresponding information are maintained in a unified AI asset inventory.

4. The method of claim 1, further comprising:

upon determining an identity of a discovered AI asset with an unknown identity, maintaining the identity of the discovered AI asset along with its corresponding information inside a unified AI asset inventory.

5. The method of claim 1, wherein extracting the natural language text from the collected data is performed, at least in part, using a regression model.

6. The method of claim 1, wherein an AI asset comprises any one of: a tool, a data source, or another AI component used in development, deployment, or operation of an AI system.

7. The method of claim 1, wherein classifying the extracted natural language text comprises using a trained classifier or a trained large language model (LLM).

8. The method of claim 1, wherein analyzing the collected data corresponding to the discovered one or more AI assets with unknown identities, to determine each of their identities is performed, at least in part, using one or more large language models (LLMs) and a reasoning model.

9. The method of claim 1, further comprising:

performing data enrichment to collect additional metadata corresponding to the one or more AI assets with unknown identities from one or more external sources using one or more AI agents within an AI discovery engine.

10. A system for end-to-end artificial intelligence (AI) asset discovery comprising:

one or more processors configured to:

discover one or more AI assets across a networked environment;

determine if one or more of the discovered one or more AI assets have unknown identities;

upon determining that one or more of the discovered one or more AI assets have unknown identities, analyze collected data corresponding to the discovered one or more AI assets with unknown identities, to determine each of their identities;

upon determining that one or more of the discovered one or more AI assets have unknown identities, extract natural language text from the collected data;

classify the extracted natural language text into conversational text and non-conversational text;

process the conversational text to determine conversation participants in each conversation in the discovered one or more AI assets; and upon determining that at least one conversation in the discovered one or more AI assets has at least one user and at least one AI agent as conversation participants, confirm one or more AI assets to which the at least one conversation belongs to as AI assets.

11. The system of claim 10, wherein extracting the natural language text from the collected data is performed, at least in part, using a regression model.

12. The system of claim 10, wherein the one or more processors, when classifying the extracted natural language text, are configured to use a trained classifier or a trained large language model (LLM).

13. The system of claim 10, wherein the one or more processors, when determining if one or more of the discovered one or more AI assets have unknown identities, are configured to:

embed the collected data using a data processing engine; and perform hybrid similarity to compare the discovered one or more AI assets to previously identified AI assets using a reasoning model, wherein hybrid similarity combines vector similarity and metadata matching.

14. The system of claim 13, wherein identities of the previously identified AI assets and their corresponding information are maintained in a unified AI asset inventory.

15. The system of claim 10, wherein the one or more processors are further configured to:

upon determining an identity of a discovered AI asset with an unknown identity, maintain the identity of the discovered AI asset along with its corresponding information inside a unified AI asset inventory.

16. The system of claim 10, wherein an AI asset comprises any one of: a tool, a data source, or another AI component used in development, deployment, or operation of an AI system.

17. The system of claim 10, wherein analyzing the collected data corresponding to the discovered one or more AI assets with unknown identities, to determine each of their identities is performed, at least in part, using one or more large language models (LLMs) and a reasoning model.

18. The system of claim 10, wherein the one or more processors are further configured to:

perform data enrichment to collect additional metadata corresponding to the one or more AI assets with unknown identities from one or more external sources using one or more AI agents within an AI discovery engine.

19. A non-transitory computer-readable medium storing a set of instructions for end-to-end artificial intelligence (AI) asset discovery, the set of instructions comprising:

one or more instructions that, when executed by one or more processors of a device, cause the device to:

discover one or more AI assets across a networked environment;

determine if one or more of the discovered one or more AI assets have unknown identities;

upon determining that one or more of the discovered one or more AI assets have unknown identities, analyze collected data corresponding to the discovered one or more AI assets with unknown identities, to determine each of their identities;

upon determining that one or more of the discovered one or more AI assets have unknown identities, extract natural language text from the collected data;

classify the extracted natural language text into conversational text and non-conversational text;

process the conversational text to determine conversation participants in each conversation in the discovered one or more AI assets; and upon determining that at least one conversation in the discovered one or more AI assets has at least one user and at least one AI agent as conversation participants, confirm one or more AI assets to which the at least one conversation belongs to as AI assets.

* * * * *